United States Patent
Bal et al.

(10) Patent No.: US 10,322,407 B2
(45) Date of Patent: Jun. 18, 2019

(54) CATALYST FOR CARBON MONOXIDE OXIDATION AND PROCESS FOR THE PREPARATION THEREOF

(71) Applicant: COUNCIL OF SCIENTIFIC & INDUSTRIAL RESEARCH, New Delhi (IN)

(72) Inventors: Rajaram Bal, Dehradun (IN); Chandrashekar Pendem, Dehradun (IN); Ankur Bordoloi, Dehradun (IN)

(73) Assignee: Council of Scientific & Industrial Research, New Delhi (IN)

( * ) Notice: Subject to any disclaimer, the term of this patent is extended or adjusted under 35 U.S.C. 154(b) by 1 day.

(21) Appl. No.: 15/380,378

(22) Filed: Dec. 15, 2016

(65) Prior Publication Data

US 2017/0173566 A1 Jun. 22, 2017

(30) Foreign Application Priority Data

Dec. 17, 2015 (IN) .......................... 4143/DEL/2015

(51) Int. Cl.
*C01B 3/58* (2006.01)
*B01J 23/83* (2006.01)
*B01J 37/02* (2006.01)
*B01J 37/03* (2006.01)
*B01J 37/04* (2006.01)
*B01J 37/06* (2006.01)
*B01J 37/08* (2006.01)

(52) U.S. Cl.
CPC ........... *B01J 23/83* (2013.01); *B01J 37/0236* (2013.01); *B01J 37/031* (2013.01); *B01J 37/04* (2013.01); *B01J 37/06* (2013.01); *B01J 37/08* (2013.01); *C01B 3/583* (2013.01); *C01B 2203/044* (2013.01); *C01B 2203/047* (2013.01); *C01B 2203/066* (2013.01)

(58) Field of Classification Search
None
See application file for complete search history.

(56) References Cited

PUBLICATIONS

Maciel et al (Effect of nature of ceria support in CuO/CeO2 catalyst for PROX-CO reaction, Fuel 97(2012) 245-252).*

Djinovic et al (Comparison of water-gas shift reaction activity and long-term stability of nanostructured CuO—CeO2 catalysts prepared by hard template and co-precipitation methods, App Cata A: Gen 364 (2009) 156-165).*

Ayastuy, J.L., et al., "MnO$_x$/Pt/Al$_2$O$_3$ catalysts for CO oxidation in H$_2$-rich streams," Applied Catalysis B: Environmental Jan. 2007; 70(1-4):532-541, doi: 10.1016/j.apcatb.2006.01.028, Elsevier B.V., Netherlands.

Huang, Y., et al., "Preferential oxidation of CO under excess H$_2$ conditions over iridium catalysts," International Journal of Hydrogen Energy Nov. 2007; 32(16):3880-3886, doi: 10.1016/j.ijhydene. 2007.03.031, Elsevier Ltd., England.

Li, Y., et al., "Catalytic activity for CO oxidation of Cu—CeO$_2$ composite nanoparticles synthesized by a hydrothermal method," Anal. Methods Mar. 2015; 7:3238-3245, doi: 10.1039/C5AY00261C, Royal Society of Chemistry, England.

Luengnaruemitchai, A., et al., "A comparative study of synthesized and commercial A-type zeolite-supported Pt catalysts for selective CO oxidation in H$_2$-rich stream," International Journal of Hydrogen Energy Jan. 2008; 33(1):206-213, doi: 10.1016/j.ijhydene.2007.09. 003, Elsevier Ltd., England.

Tanaka, H., et al., "Catalytic performance of K-promoted Rh/USY catalysts in preferential oxidation of CO in rich hydrogen," Applied Catalysis A: General Sep. 2003; 250(2):255-263, 10.1016/S0926-860X(03)00320-X, Elsevier B.V., Netherlands.

Wang, H., et al., "Preferential oxidation of CO in H$_2$ rich stream over Au/CeO$_2$—Co$_3$O$_4$ catalysts," Catalysis Communications Mar. 2008; 9(6):1487-1492, doi: 10.1016/j.catcom.2007.12.017, Elsevier B.V., Netherlands.

Woods, M.P., "Preferential oxidation of carbon monoxide on Co/CeO$_2$ nanoparticles," Applied Catalysis B: Environmental Jun. 2010; 97(1-2):28-35, doi: 10.1016/j.apcatb.2010.03.015, Elsevier B.V., Netherlands.

Zhang, W., et al., "IrFeO$_x$/SiO$_2$—A highly active catalyst for preferential CO oxidation in H$_2$," International Journal of Hydrogen Energy Apr. 2010; 35(7):3065-3071, doi: 10.1016/j.ijhydene.2009. 07.016, Elsevier Ltd., England.

* cited by examiner

*Primary Examiner* — Melvin C. Mayes
*Assistant Examiner* — Michael Forrest
(74) *Attorney, Agent, or Firm* — Sterne, Kessler, Goldstein & Fox P.L.L.C.

(57) ABSTRACT

The present invention provides a catalyst and a process for the selective oxidation of carbon monoxide (CO) to produce carbon dioxide gas (CO$_2$). The process provides a process which selectively oxidizes CO to CO$_2$ in presence of excess hydrogen. The process provides a selective oxidation of CO to CO$_2$ gas over Cu/CeO$_2$ catalyst between temperature range 40° C. to 90° C. at atmospheric pressure in presence of excess H$_2$, H$_2$O and CO$_2$. The process provides a CO conversion up to 100% without deactivation till 100 h.

10 Claims, 5 Drawing Sheets

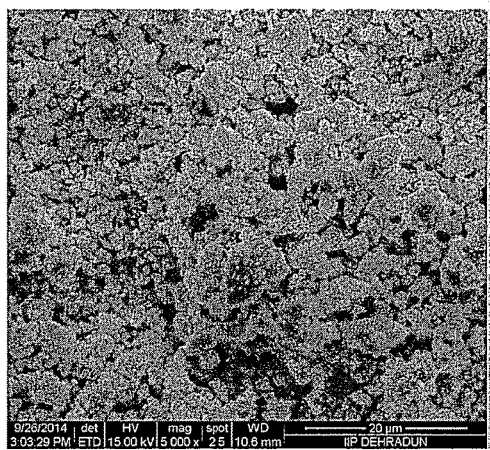 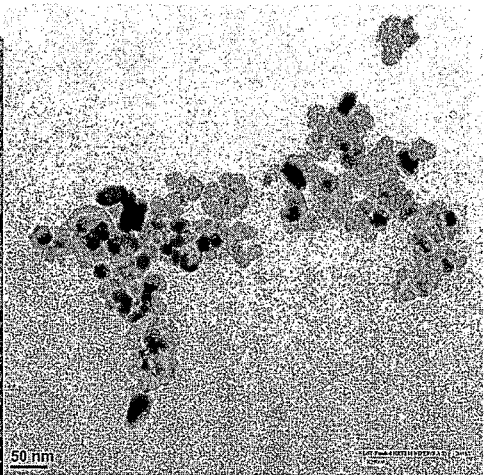
Fig. 2　　　　　　　　　　Fig. 3
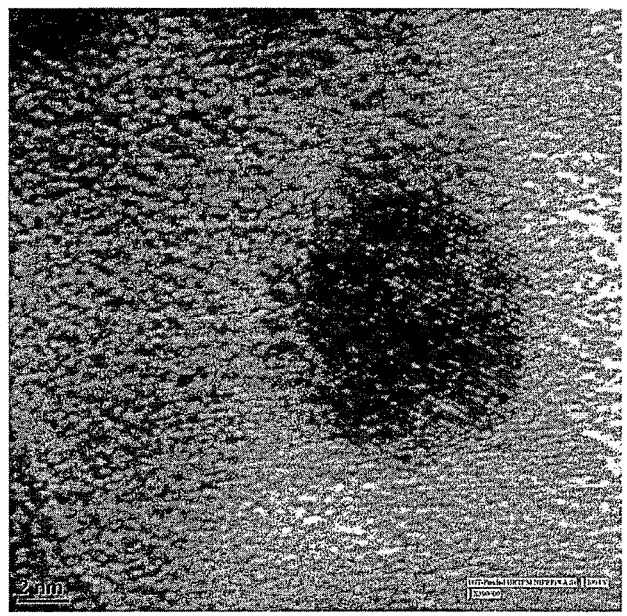
Fig. 4

CATALYST FOR CARBON MONOXIDE OXIDATION AND PROCESS FOR THE PREPARATION THEREOF

FIELD OF INVENTION

The present invention relates to a nanosize Cu—Ce oxide catalyst for preferential oxidation of carbon monoxide and a process for the preparation thereof. Particularly, the present invention relates to a process for the preferential oxidation at low temperature for the production of carbon dioxide gas using nanosize Cu—Ce oxide catalyst. More particularly, the present invention relates to a process for the preferential oxidation of carbon monoxide to carbon dioxide gas between temperature ranges of 40° C. to 100° C. at atmospheric pressure over Cu—$CeO_2$ solid catalyst. The process provides a carbon monoxide conversion of 100% without deactivation till 100 h.

BACKGROUND OF THE INVENTION

Hydrogen as the most efficient and cleanest energy source for fuel cell power is produced by partial oxidation followed by water-gas shift reaction and reforming of hydrocarbons or methanol. Recent works on the preferential oxidation of carbon monoxide in hydrogen rich gases for fuel cell applications are summarized. $H_2$ is used as a fuel for polymer-electrolyte membrane fuel cell (PEMFC). It is produced by reforming of natural gas or liquid fuels followed by water gas shift reaction. The produced gas consist of $H_2$, CO, and $CO_2$. In which CO content is around 1%, which is highly poisonous for the Pt anode of the PEMFC so that further removal of CO is needed. Catalytic preferential oxidation of CO (CO-PROX) is one of the most suitable methods of purification of $H_2$ because of high CO conversion to $CO_2$ at low temperature range, which is preferable for PEMFC operating conditions. Catalysts used for CO-PROX are mainly noble metal based; gold based and base metal oxide catalysts among them Copper-Ceria based catalysts are the most appropriate due to its low cost, easy availability and result obtained by these catalysts are comparable with the conventional noble metal catalysts.

Reference may be made to article in the *Int. J. Hydrogen Energy* 32: 3880-3886, 2007 by Huang et al. where they used iridium based catalysts (Ir/$CeO_2$) which exhibited excellent performance in PROX process. Reductive pre-treatment of Ir/$CeO_2$ was found to be beneficial to obtain higher CO oxidation activity at low temperatures. The presence of 1.60 wt % of Ir was essential for obtaining high activity in the PROX reaction. The reaction was performed at 80° C. with GHSV 40000 ml $g^{-1}$ $h^{-1}$ (2% $CO_3$ 1% $O_2$, 40% $H_2$, He) 70% conversion, negligible influence of $H_2O$ on activity, $CO_2$ affected negatively.

Reference may be made to article in the *Int. J. Hydrogen Energy* 32: 3880, 2007 by Huang et al. where they prepared iridium based catalysts (Ir/CeO2) which exhibited excellent performance in PROX process. Reductive pre-treatment of Ir/CeO2 was found to be beneficial to obtain higher CO oxidation activity at low temperatures. The presence of 1.60 wt % of Ir was essential for obtaining high activity in the PROX reaction. The reaction was performed at 80° C. with GHSV 40000 ml $g^{-1}$ $h^{-1}$ (2% $CO_3$ 1% $O_2$, 40% $H_2$, He) 70% conversion, negligible influence of $H_2O$ on activity, $CO_2$ affected negatively.

Reference may be made to article in the *Int. J. Hydrogen Energy* 35: 3065-3071, 2010 by Zhang et al. where they prepared bi-functional catalyst Ir-FeOx/$SiO_2$, which was active and selective for preferential oxidation of CO under $H_2$-rich atmosphere. Although the activity of the catalyst is good but the reaction temperature was high and the expensive metal like Ir was used as a catalyst.

Reference may be made to article in *Appl Catal. A: general* 250: 255-263, 2003 by Tanaka et al. where they reported high performance in preferential oxidation of CO in rich hydrogen over K-promoted Rh/USY (K/Rh=3) catalysts. The concentration of CO was below 10 ppm after this process. The addition of potassium to Rh/USY also promoted the activity of CO oxidation without hydrogen. The reaction was performed at 140° C. (75% $H_2$, 0.2% $CO_3$ and 0.2% $O_2$)>99.5% conversion, potassium increases activity of CO oxidation.

Reference may be made to article in *Catal B: Environ.* 97: 28-35, 210. By Woods et al. where they reported high conversion (≈100% conversion) at high temperature 275° C. But in presence of excess $H_2$ decreases the CO oxidation rate. In this reaction feed was 1% CO, 1% $O_2$, 60% $H_2$, 1% $CO_2$ and GHSV was 30000 ml g-1 h-1.

Reference may be made to article in the *Int. J Hydrogen Energy* 33: 206-213, 2008 Luengnaruemitchai et al. made a comparative study of synthesized and commercial A-type zeolite supported Pt catalysts for selective CO oxidation in $H_2$-rich stream. The feed composition was 40% H2, 1% CO, 1% O2, 0-10% CO2, 0-10% $H_2O$ and temperature was 100-300° C. The conversion was around ~95%, no effect of CO2 on the conversion. $H_2O$ depressed the selectivity and conversion both.

Reference may be made to article in the *Appl. Catal. B: environ.* 70: 532-541, 2007 Ayastuy et al. used MnOx/Pt/$Al_2O_3$ and reported that high CO conversion at high temperature range. 15 wt. % MnOx Pt/$Al_2O_3$ was used with 1% CO, 1% $O_2$, 60% $H_2$—He at 160° C., WHSV 12000 $h^{-1}$ conversion was 100% $CO_2$ enhances activity, $H_2O$ inhibits activity with higher MnOx content.

Reference may also be made to article in the *Catal. Commun.* 9: 1487-1492, 2008 Wang et al. used Au/$CeO_2$—$Co_3O_4$ catalysts with a Ce/Co atomic ratio from 0.1 to 0.6 which were prepared by deposition precipitation. CO conversion is 91% while selectivity is around 51% at temperature 80° C.

Reference may also be made to Journal Analytical methods 7: 3238-3245, 2015 where the authors used Cu—$CeO_2$ catalyst to get CO conversion at 180° C. without any addition of excess hydrogen, or $H_2O$ or $CO_2$. Although the elemental composition of the catalyst is same (Cu, Ce, O) but the morphology of the catalyst is totally different and this catalyst cannot be used practically for fuel cell operating condition where typical reaction temperature is between 80-120° C. and the feed contains CO, $O_2$, excess hydrogen, $CO_2$ and $H_2O$.

The feed composition was 1% CO, 1% $O_2$, and 50% $H_2$ at with GHSV 30000 ml $g^{-1}$ $h^{-1}$. The Cu-based catalysts at relatively low and stable price compared to other platinum group metals, could help reduce the cost of fuel cell technologies. To the best of our knowledge there is not a single report where supported Cu catalyst is used for CO oxidation in presence of excess $H_2$ at low temperatures.

OBJECTS OF THE INVENTION

Main object of the present invention is to provide Cu—Ce oxide catalyst for oxidation of carbon monoxide and a process for the preparation thereof.

Another object of the present invention is to provide a process for preferential oxidation of carbon monoxide to carbon dioxide at low temperatures in presence of excess $H_2$ over nanocrystalline Cu—Ce oxide catalyst using oxygen as an oxidant.

Yet another object of the present invention is to provide a process which works under continuous process at atmospheric pressure for the production carbon dioxide gas from carbon monoxide.

Yet another object of the present invention is to provide a catalyst with a mixture of Cu and Ce oxide which can be prepared easily and also very economical to produce carbon dioxide by preferential oxidation of carbon monoxide in presence of excess hydrogen.

Yet another object of the present invention is to provide a catalyst which selectively oxidize carbon monoxide to carbon dioxide in presence of excess hydrogen, carbon dioxide, and water.

Yet another object of the present invention is to provide a process, which selectively gives 100% carbon dioxide gas from carbon monoxide.

SUMMARY OF THE INVENTION

Accordingly, present invention provides a nanocrystalline Cu—Ce oxide catalyst comprises CuO in the range of 5-10 wt % and $CeO_2$ in the range of 95-90 wt % wherein 2 to 5 nm Cu nanoparticles are present on 10-20 nm $CeO_2$ nanoparticles.

In an embodiment, present invention provides a process for the preparation of nanocrystalline Cu—Ce oxide catalyst comprising the steps of:
  i. precipitating $CuCl_2$, Ce salt with 20 to 25% $NH_3$ solution followed by adjusting pH in the range of 7 to 8 to obtain solution;
  ii. adding cetyltrimethylammonium bromide (CTAB), Polyvinylpyrrolidone (PVP) in the solution as obtained in step (i) followed by stirring for period in the range of 1 to 2 h at room temperature in the range of 20 to 30° C. to obtain substance;
  iii. heating the substance as obtained in step (ii) at temperature in the range of 170 to 180° C. in a autoclave for period in the range of 20 to 25 h followed by cooling at room temperature in the range of 20 to 30° C., washing and dried for period in the range of 10 to 12 hr at temperature in the range of 90 to 100° C. to obtain solid;
  iv. calcining the solid as obtained in step (iii) at temperature in the range of 500 to 550° C. for period in the range of 4-8 hours to obtain nanocrystalline Cu—Ce oxide catalyst.

In an embodiment of the present invention, the Ce salt used in step (a) is cerium chloride heptahydrate.

In another embodiment of the present invention, wt % ratio of Cu and Ce is in the range of 5:95 to 10:90.

In yet another embodiment of the present invention, said catalyst is useful for activation of carbon monoxide to obtain carbon dioxide gas, wherein the said process comprising the steps of:
  i. passing $O_2$:CO:He:$H_2$:$H_2O$:$CO_2$ mixture in a molar ratio ranging between 3:6:91:0:0:0 to 3:6:11:50:10:20 (mol %) to in a reactor at atmospheric pressure in the presence of nanocrystalline Cu—Ce oxide catalyst at a temperature ranging between 40-100° C. for a period ranging between 1-100 hrs at a gas hourly space velocity (GSHV) ranging between 3000-20000 ml$g^{-1}$ $h^{-1}$ to obtain carbon dioxide gas.

In yet another embodiment of the present invention, the process is carried out at temperature in the range 30 to 100° C.

In yet another embodiment of the present invention, conversion of carbon monoxide is in the range of 1-100%.

In yet another embodiment of the present invention, the $O_2$/CO ratio obtained in the range of 1:2.

In yet another embodiment of the present invention, gas hourly space velocity (GHSV, feed/$g_{catalyst}$/hour) is preferably in the range of 3500 to 18000 ml $g^{-1}$ $h^{-1}$.

In yet another embodiment of the present invention, conversion of methane is in the range of 1 to 100%.

DETAILED DESCRIPTION OF THE INVENTION

Figure 1:
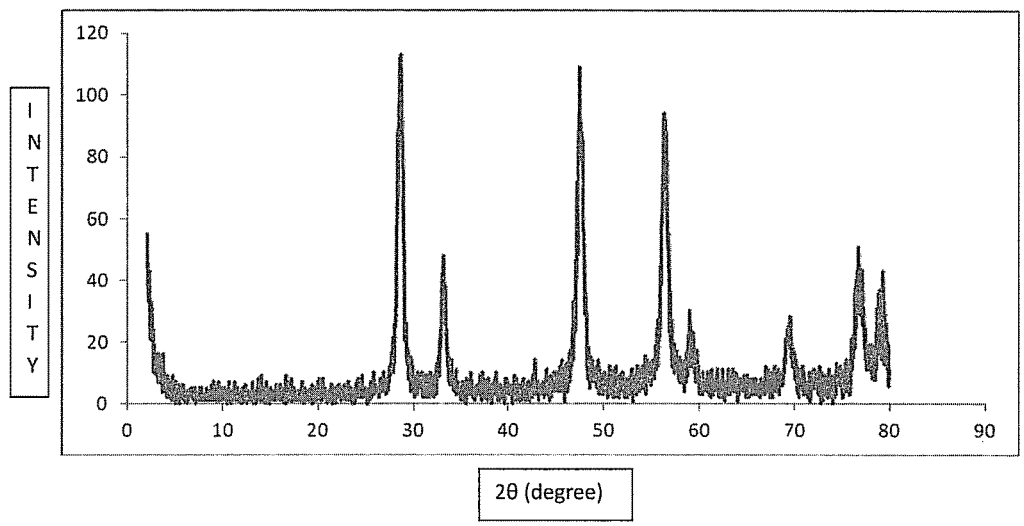
FIG. 1 X-ray Diffraction (XRD) of 5% Cu—$CeO_2$
FIG. 2 Scanning Electron Microscope (SEM) image of 5% Cu—$CeO_2$
FIG. 3 Low magnification Transmission Electron Microscope (TEM) image of 5% Cu—$CeO_2$
FIG. 4 High magnification TEM image of 5% Cu—$CeO_2$
FIG. 5 Mapping of O in 5% Cu—$CeO_2$
FIG. 6 Mapping of Ce in 5% Cu—$CeO_2$
FIG. 7 Mapping of Cu in 5% Cu—$CeO_2$
FIG. 8 Energy Dispersive X-ray analysis (EDAX) of Cu in 5% Cu—$CeO_2$.

Present invention provides Cu—Ce oxide catalyst having formula CuO—$CeO_2$ comprises CuO in the range of 5-10 wt % and $CeO_2$ in the range of 90-95 wt % and a process for the preparation thereof.

The present invention provides a process for the preparation of nanocrystalline Cu—Ce oxide comprising the steps of:
  i. Synthesis of Cu—$CeO_2$ oxide was carried out using precipitation of $CuCl_2$, $CeCl_3.7H_2O$ with 25% $NH_3$ solution where $CuCl_2$ and $CeCl_3.7H_2O$ was used as the precursor of Cu and Ce.
  ii. The pH of the mixture was adjusted at 8.
  iii. After adding $NH_3$ solution, cetyltrimethylammonium bromide (CTAB), Polyvinylpyrrolidone (PVP) were added.
  iv. The mixed solution was stirred for 1-2 h at room temperature (i.e. 20 to 30° C.).
  v. The substance was transferred to a Teflon lined stainless steel autoclave and heated at 180° C. for 20-25 h. The solid obtained was calcined at 550° C. for a time period in the range of 4-8 hours to obtain Cu—Ce oxide.

The weight ratio of Cu to $CeO_2$ varied in the range between 5-10%.

The present invention provides Cu—Ce oxide catalyst for selective oxidation of carbon monoxide with oxygen to obtain carbon dioxide gas, wherein the said process is carried out in the presence or absence of hydrogen.

The present invention provides a process for selective oxidation of carbon monoxide with oxygen using Cu—Ce oxide catalyst in the absence of hydrogen comprises:

i. passing $O_2$:CO:He mixture with a molar ratio of 1:2:18 in a reactor at atmospheric pressure in the presence of nanocrystalline Cu—Ce oxide catalyst at a temperature ranging between 40-100° C. for a period ranging between 1-100 h at a gas hourly space velocity (GHSV) ranging between 3000-20000 $mlg^{-1}$ $h^{-1}$ to obtain carbon dioxide gas.

The present invention provides a process for selective oxidation of carbon monoxide with oxygen using Cu—Ce oxide catalyst in the presence of hydrogen comprises:

i. passing $O_2$:CO:He:$H_2$:$H_2O$:$CO_2$ mixture with a molar ratio of 3:6:91:0:0:0 to 3:6:11:50:10:20 (mol %) to in a reactor at atmospheric pressure in the presence of nanocrystalline Cu—Ce oxide catalyst at a temperature ranging between 40-100° C. for a period ranging between 1-100 hrs at a gas hourly space velocity (GSHV) ranging between 3000-20000 $mlg^{-1}$ $h^{-1}$ to obtain carbon dioxide gas.

The selective oxidation of carbon monoxide was carried out in a fixed-bed down flow reactor at atmospheric pressure for 1-100 h to get carbon dioxide.

The reaction temperature is preferably in the range 30-100° C.

The gas hourly space velocity (GHSV, feed/$g_{catalyst}$/hour) is preferably in the range 3000 to 20000 ml g-1 h-1 more preferably in the range 3500 to 18000 ml $g^{-1}$ $h^{-1}$.

The carbon monoxide conversion is obtained up to 100%.
The reaction time used is preferably in the range 1-100 h.
The conversion of methane is in the range of 1 to 100%.
The $O_2$/CO ratio obtained in the range of 1:2.

General Procedure for the Selective Oxidation of Carbon Monoxide to Carbon Dioxide The selective oxidation of carbon monoxide was carried out in a fixed-bed down flow reactor at atmospheric pressure. Typically 300 to 500 mg of previously reduced (reduced at 450° C. with 20% $H_2$ balance He for 1-3 hr.) catalyst was placed in between two quartz wool plugged in the centre of the 6 mm quartz reactor. The reaction was carried out with the freshly prepared catalyst at different temperatures ranging 40-100° C. The gas hourly space velocity (GHSV) was varied between 3000 to 20000 ml $g^{-1}$ $h^{-1}$ with a molar ratio of $O_2$:CO:He of 1:2:18. The reaction products were analyzed using an online gas chromatography (Thermo Scientific TRACE GC 700) fitted with a TCD detector using column Unibeads-C (for analyzing $H_2$, $CO_2$ and CO).

The following examples are given by way of illustration of working of the invention in actual practice and should not be constructed to limit the scope of the present invention in any way.

Example 1: Preparation of 5% Cu on Cerium Oxide Support

Cu nanoparticles on cerium oxide support were prepared hydrothermally. All chemicals were used without further purification. Catalyst synthesis was carried out under ambient conditions. In a typical preparation method, 0.5289 g $CuCl_2$ and 10.2823 g $CeCl_3.7H_2O$ were dissolved in 150 ml by stirring that gave a light blue solution. The pH of the solution was measured by pH Meter, which was standardised for pH measurement before use. The ammonia solution was added drop by drop gradually until the pH of the solution was 8. Then alcoholic solution of CTAB (50% aqueous alcohol) was added in that mixture under vigorous stirring condition (2000 rpm) for half an hour to form gel. Then alcoholic solution of Polyvinylpyrrolidone (PVP) was added under stirring condition. Stirring was continued for 2 h. All the reagents were used maintain the ratio Cu:CTAB:PVP:$H_2O$=0.25:0.1875:0.0937:150. The resulting mixture was treated hydrothermally in a Teflon lined stainless steel autoclave (1000 ml capacity) at 180° C. for 24 h and then cooled it to room temperature (25° C.). The obtained material was successively washed with distilled water and dried overnight (12 hr) at 100° C. At last the dried material was calcined at 550° C. in presence of air for 6 h. The material was characterized by XRD, SEM and TEM.

Figure 5:
Figure 6:
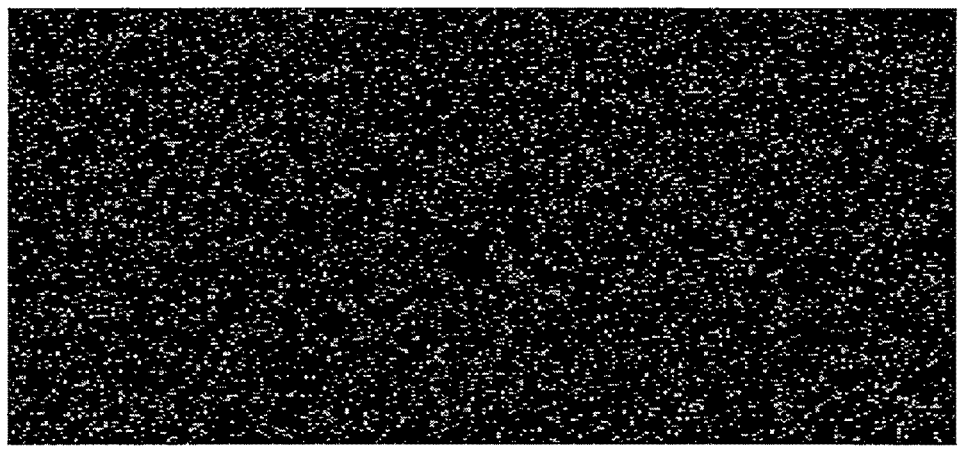
Figure 7:
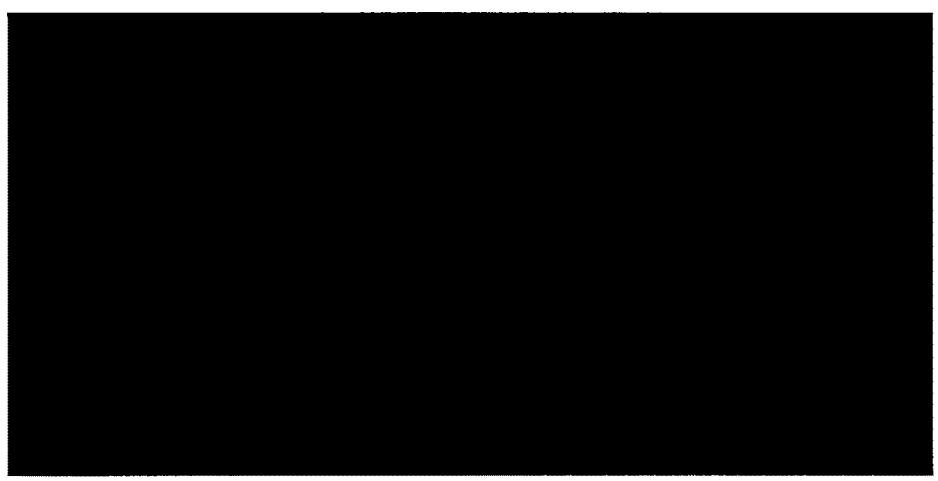
Figure 8:
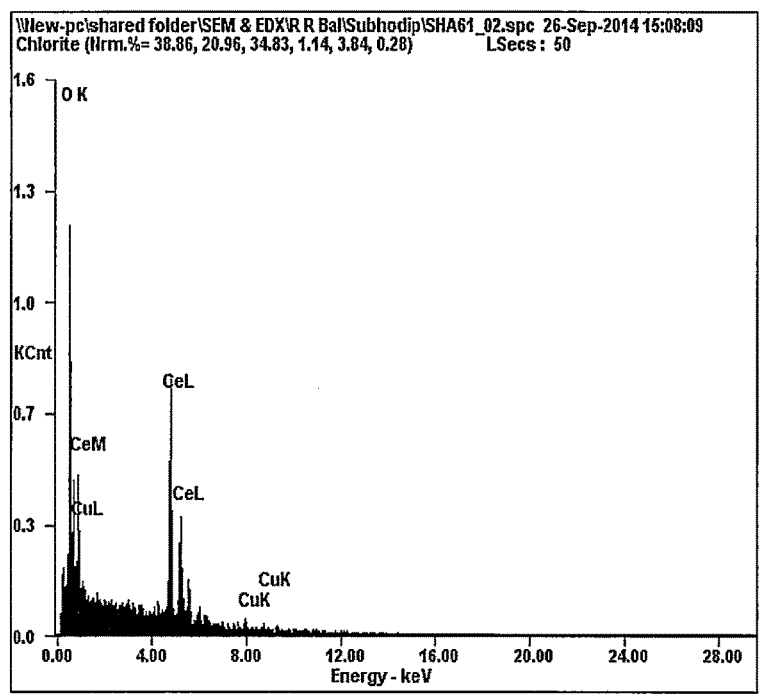
Figure 9:
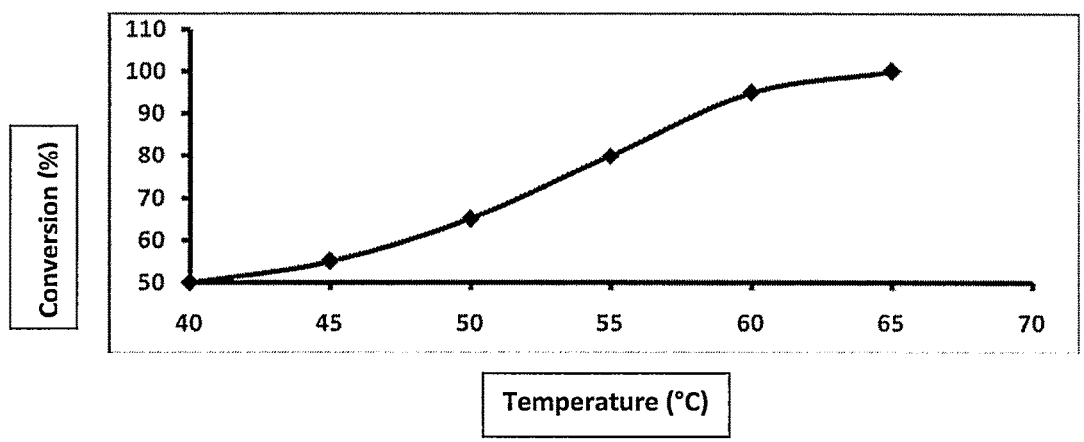
FIG. 9 Effect of temperature on conversion of carbon monoxide and oxidation of carbon monoxide at 65° C. in presence of hydrogen
FIG. 10 Effect of temperature on conversion of carbon monoxide and oxidation of carbon monoxide in presence of hydrogen, carbon dioxide and water vapour
FIG. 11 Effect of time on conversion of carbon monoxide and oxidation of carbon monoxide in presence of hydrogen, carbon dioxide and water vapour
Figure 10:
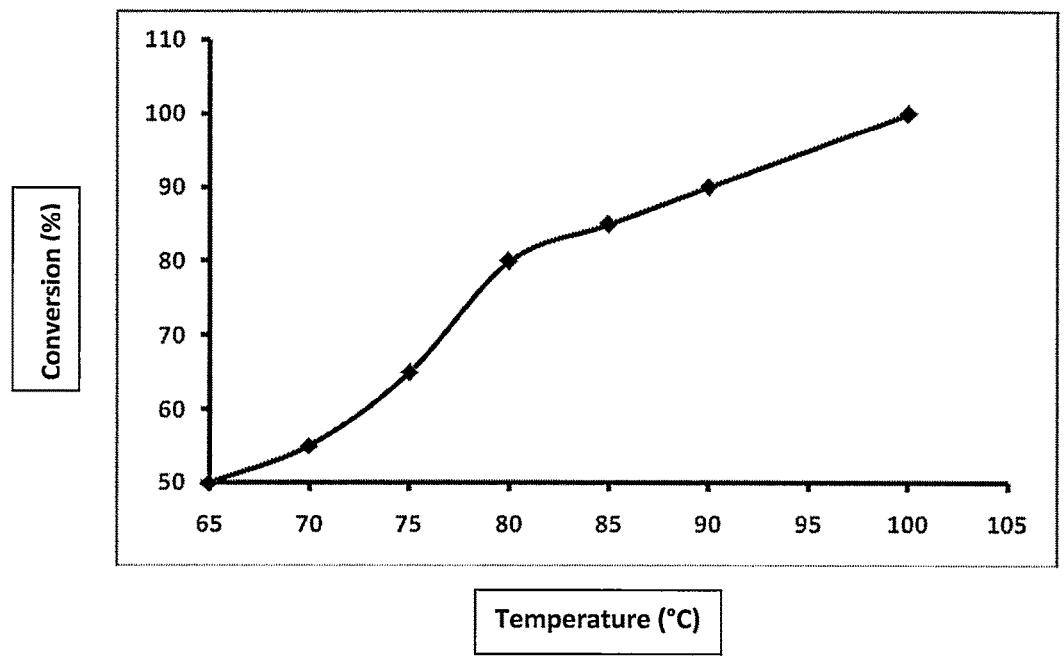
Figure 11:
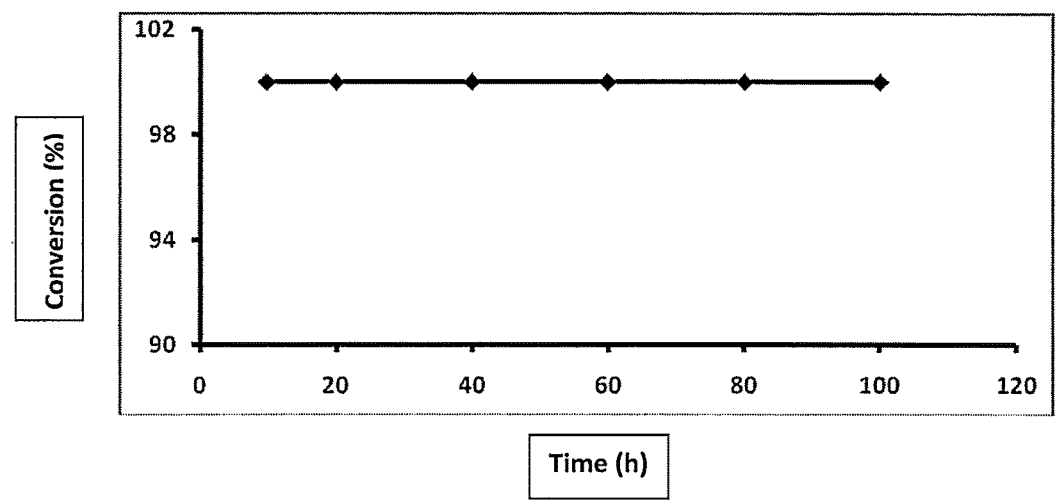

The XRD pattern of the 5% Cu—$CeO_2$ is shown in FIG. 1. XRD depicts the presence of $CeO_2$ in the sample. Cu nanoparticle was not shown because of very small size. The morphology of the material (5% Cu—$CeO_2$) was characterized by SEM. The typical image of the 5% Cu—$CeO_2$ is shown in FIG. 2. From the TEM image it is clear that the particles are almost spherical in shape. The typical TEM images of the 5% Cu—$CeO_2$ are shown in FIG. 3-4, which indicate that 5-10 nm Cu nanoparticles are present on 10-20 nm $CeO_2$ nanoparticles. FIG. 3 is the TEM images at low magnification and FIG. 4 is the image of the 5% Cu—$CeO_2$ at very high magnification. The dispersion of the Cu particles on $CeO_2$ support was analyzed by taking the elemental mapping of oxygen, Ce and Cu using SEM as shown in FIGS. 5-7 and the mapping confirms that Cu is highly dispersed on $CeO_2$.

Example 2: Preparation of 10% Cu on Cerium Oxide Support

Cu nanoparticles on cerium oxide support were prepared hydrothermally. All chemicals were used without further purification. Catalyst synthesis was carried out under ambient conditions. In a typical preparation method, 1.0579 g $CuCl_2$ and 9.7412 g $CeCl_3.7H_2O$ were dissolved in 150 ml by stirring that gave a light blue solution. The pH of the solution was measured by pH Meter, which was standardised for pH measurement before use. The ammonia solution was added drop by drop gradually until the pH of the solution was 8. Then alcoholic solution of CTAB (50% aqueous alcohol) was added in that mixture under vigorous stirring condition (2000 rpm) for half an hour to form gel. Then alcoholic solution of PVP was added under stirring condition. Stirring was continued for 2 h. All the reagents were used maintain the ratio Cu:CTAB:PVP:$H_2O$=0.5:0.375:0.1875:150. The resulting mixture was treated hydrothermally in a Teflon lined stainless steel autoclave (1000 ml capacity) at 180° C. for 24 h and then cooled it to room temperature (30° C.). The obtained material was successively washed with distilled water and dried overnight (12 hr) at 100° C. At last the dried material was calcined at 550° C. in presence of air for 6 h.

Example 3

The example describes the effect of time on conversion. The product analysis presented in Table-1.
Process Conditions
Catalyst: 0.50 g
Cu:$CeO_2$ weight ratio in the catalyst=5:95.
Process pressure: 1 atm.
Process temperature: 50° C.

Gas hourly space velocity (GHSV): 7500 ml g$^{-1}$ h$^{-1}$
Reaction time: 100 h
$O_2$:CO:He=5:10:85 (mol %)

TABLE 1

Effect of time on conversion of carbon monoxide and oxidation of carbon monoxide

| Temperature (° C.) | GHSV (mlg$^{-1}$h$^{-1}$) | Carbon monoxide Conversion (%) | Hour (h) |
|---|---|---|---|
| 47 | 7500 | 100 | 10 |
| 47 | 7500 | 100 | 20 |
| 47 | 7500 | 100 | 40 |
| 47 | 7500 | 100 | 60 |
| 47 | 7500 | 100 | 80 |
| 47 | 7500 | 100 | 100 |

Example 4

The example describes the effect of gas hourly space velocity (GHSV) conversion. The product analysis presented in Table-2.
Process Conditions
Catalyst: 0.50 g
Cu:CeO$_2$ weight ratio in the catalyst=5:95.
Process pressure: 1 atm.
Process temperature: 50° C.
Gas hourly space velocity (GHSV): 3750 ml g$^{-1}$ h$^{-1}$ to 10000 ml g$^{-1}$ h$^{-1}$
Reaction time: 100 h
$O_2$:CO:He=5:10:85 (mol %)

TABLE 2

Effect of space velocity on conversion of carbon monoxide and oxidation of carbon monoxide

| Temperature (° C.) | GHSV (mlg$^{-1}$h$^{-1}$) | Carbon monoxide Conversion (%) | Hour (h) |
|---|---|---|---|
| 50 | 7500 | 100 | 100 |
| 50 | 10000 | 95 | 100 |
| 50 | 3750 | 100 | 100 |

Example 5

The example describes the effect of time on conversion. The product analysis presented in Table-3.
Process Conditions
Catalyst: 0.50 g
Cu:CeO$_2$ weight ratio in the catalyst=5:95.
Process pressure: 1 atm.
Process temperature: 65° C.
Gas hourly space velocity (GHSV): 15000 ml g$^{-1}$ h$^{-1}$
Reaction time: 100 h
$O_2$:CO:He:H$_2$=3:6:41:50 (mol %)

TABLE 3

Effect of time on conversion of carbon monoxide and selective oxidation of carbon monoxide at 65° C. in presence of hydrogen

| Temperature (° C.) | GHSV (mlg$^{-1}$h$^{-1}$) | Carbon monoxide Conversion (%) | Hour (h) |
|---|---|---|---|
| 65 | 15000 | 100 | 10 |
| 65 | 15000 | 100 | 20 |
| 65 | 15000 | 100 | 40 |

TABLE 3-continued

Effect of time on conversion of carbon monoxide and selective oxidation of carbon monoxide at 65° C. in presence of hydrogen

| Temperature (° C.) | GHSV (mlg$^{-1}$h$^{-1}$) | Carbon monoxide Conversion (%) | Hour (h) |
|---|---|---|---|
| 65 | 15000 | 100 | 60 |
| 65 | 15000 | 100 | 80 |
| 65 | 15000 | 100 | 100 |

The process produces very high conversion at low temperature which is also a major advantage of this process.
The catalyst shows no deactivation up to 100 h time on stream at 65° C.
The catalyst is used in very low amounts.

Example 6

The example describes the effect of temperature on conversion. The product analysis presented in Table-4.
Process Conditions
Catalyst: 0.50 g
Cu:CeO$_2$ weight ratio in the catalyst=5:95.
Process pressure: 1 atm.
Process temperature: 40° C. to 65° C.
Gas hourly space velocity (GHSV): 15000 ml g$^{-1}$ h$^{-1}$
Reaction time: 10 h
$O_2$:CO:He:H$_2$=3:6:41:50 (mol %)

TABLE 4

Effect of temperature on conversion of carbon monoxide and oxidation of carbon monoxide at 65° C. in presence of hydrogen

| Temperature (° C.) | GHSV (mlg$^{-1}$h$^{-1}$) | Carbon monoxide Conversion (%) | Hour (h) |
|---|---|---|---|
| 40 | 15000 | 50 | 10 |
| 45 | 15000 | 55 | 10 |
| 50 | 15000 | 65 | 10 |
| 55 | 15000 | 80 | 10 |
| 60 | 15000 | 95 | 10 |
| 65 | 15000 | 100 | 10 |

Example—7

The example describes the effect of temperature on conversion. The product analysis presented in Table 5.
Process Conditions:
Catalyst: 0.50 g
Cu:CeO$_2$ weight ratio in the catalyst=5:95.
Process pressure: 1 atm.
Process temperature: 65° C. to 100° C.
Gas hourly space velocity (GHSV): 15000 ml g$^{-1}$ h$^{-1}$
Reaction time: 10 h
$O_2$:CO:He:H$_2$:H$_2$O:CO$_2$=3:6:11:50:10:20 (mol %)

TABLE 5

Effect of temperature on conversion of carbon monoxide and oxidation of carbon monoxide in presence of hydrogen, carbon dioxide and water vapour

| Temperature (° C.) | GHSV (mlg$^{-1}$h$^{-1}$) | Carbon monoxide Conversion (%) | Hour (h) |
|---|---|---|---|
| 65 | 18000 | 50 | 10 |
| 70 | 18000 | 55 | 10 |
| 75 | 18000 | 65 | 10 |

TABLE 5-continued

Effect of temperature on conversion of carbon monoxide and oxidation of carbon monoxide in presence of hydrogen, carbon dioxide and water vapour

| Temperature (° C.) | GHSV (mlg$^{-1}$h$^{-1}$) | Carbon monoxide Conversion (%) | Hour (h) |
|---|---|---|---|
| 80 | 18000 | 80 | 10 |
| 85 | 18000 | 85 | 10 |
| 90 | 18000 | 90 | 10 |
| 100 | 18000 | 100 | 10 |

Example 8

The example describes the effect of time on conversion. The product analysis presented in Table-6.
Process Conditions:
Catalyst: 0.50 g
Cu:CeO$_2$ weight ratio in the catalyst=5:95.
Process pressure: 1 atm.
Process temperature: 100° C.
Gas hourly space velocity (GHSV): 15000 ml g$^{-1}$ h$^{-1}$
Reaction time: 100 h
O$_2$:CO:He:H$_2$:H$_2$O:CO$_2$=3:6:11:50:10:20 (mol %)

TABLE 6

Effect of time on conversion of carbon monoxide and oxidation of carbon monoxide in presence of hydrogen, carbon dioxide and water vapour

| Temperature (° C.) | GHSV (mlg$^{-1}$h$^{-1}$) | Carbon monoxide Conversion (%) | Hour (h) |
|---|---|---|---|
| 100 | 18000 | 100 | 10 |
| 100 | 18000 | 100 | 20 |
| 100 | 18000 | 100 | 40 |
| 100 | 18000 | 100 | 60 |
| 100 | 18000 | 100 | 80 |
| 100 | 18000 | 100 | 100 |

ADVANTAGES OF THE PRESENT INVENTION

The main advantages of the present invention are:
The process of the present invention is to oxidize carbon monoxide to carbon dioxide gas through preferential oxidation of carbon monoxide in a single step with a single catalyst.
The process provides not only good conversion but also selectivity of carbon dioxide gas.
The process of the present invention is to oxidize carbon monoxide to carbon dioxide gas selectively in presence of excess hydrogen, carbon dioxide and water vapour in low temperature 100° C.
The process removes carbon monoxide gas from fuel cell to produce carbon dioxide gas which increases the lifetime of the Pt-electrode of the PEM fuel cell. This becomes the major advantages of this process.
The process does not produce any by-products which is also a major advantage of this process.
The catalyst shows no deactivation up to 100 h time on stream at 100° C. in presence of excess hydrogen, carbon dioxide and water vapor.
The catalyst is used in very low amounts.

We claim:

1. A process for the preparation of nanocrystalline Cu—Ce oxide catalyst comprising the steps of:
   i. precipitating CuCl$_2$, Ce salt with 20 to 25% NH$_3$ solution followed by adjusting pH in the range of 7 to 8 to obtain solution;
   ii. adding cetyltrimethylammonium bromide (CTAB), Polyvinylpyrrolidone (PVP) in the solution as obtained in step (i) followed by stirring for period in the range of 1 to 2 h at room temperature in the range of 20 to 30° C. to obtain substance;
   iii. heating the substance as obtained in step (ii) at temperature in the range of 170 to 180° C. in a autoclave for period in the range of 20 to 25 h followed by cooling at room temperature in the range of 20 to 30° C., washing and dried for period in the range of 10 to 12 hr at temperature in the range of 90 to 100° C. to obtain solid;
   iv. calcining the solid as obtained in step (iii) at temperature in the range of 500 to 550° C. for period in the range of 4-8 hours to obtain nanocrystalline Cu—Ce oxide catalyst.

2. The process as claimed in claim 1, wherein the Ce salt used in step (i) is cerium chloride heptahydrate.

3. The process as claimed in claim 1, wherein wt % ratio of CuO and CeO$_2$ in the Cu—Ce oxide catalyst is in the range of 5:95 to 10:90.

4. The process as claimed in claim 1, wherein nanocrystalline Cu—Ce oxide catalyst comprises CuO in the range of 5-10 wt % and CeO$_2$ in the range of 95-90 wt % wherein 2 to 5 nm Cu nanoparticles are present on 10-20 nm CeO$_2$ nanoparticles.

5. A process for the activation of carbon monoxide to obtain carbon dioxide gas, wherein the CO is activated using a nanocrystalline Cu—Ce oxide catalyst comprising CuO in the range of 5-10 wt % and CeO$_2$ in the range of 95-90 wt % wherein 2 to 5 nm Cu nanoparticles are present on 10-20 nm CeO2 nanoparticles and wherein the said process comprises the steps of:
   i. passing O$_2$:CO:He:H$_2$:H$_2$O:CO$_2$ mixture in a molar ratio ranging between 3:6:91:0:0:0 to 3:-6:-11:-50:10:20 (mol %) to a reactor at atmospheric pressure in the presence of the nanocrystalline Cu—Ce oxide catalyst at a temperature ranging between 30-100° C. for a period ranging between 1-100 hrs at a gas hourly space velocity (GSHV) ranging between 3000-20000 mlg$^{-1}$ h$^{-1}$ to obtain carbon dioxide gas.

6. The process as claimed in claim 5, wherein the process is carried out at temperature in the range 40 to 100° C.

7. The process as claimed in claim 5, wherein conversion of carbon monoxide is in the range of 1-100%.

8. The process as claimed in claim 5, wherein the O$_2$/CO ratio obtained is in the range of 1:2.

9. The process as claimed in claim 5, wherein gas hourly space velocity (GHSV, feed/g$_{catalyst}$/hour) is in the range of 3500 to 18000 ml g$^{-1}$ h$^{-1}$.

10. The process as claimed in claim 5, wherein conversion of methane is in the range of 1 to 100%.

* * * * *